United States Patent Office 3,520,896
Patented July 21, 1970

3,520,896
NICOTINATE ESTERS OF CERTAIN DI- AND
TRI-HYDROXY ALKANES
Bo Thuresson af Ekenstam, Molndal, and Carl Goran Claeson, Goteborg, Sweden, assignors to Aktiebolaget Bofors, Bofors, Sweden, a company of Sweden
No Drawing. Continuation-in-part of application Ser. No. 559,090, June 21, 1966. This application Dec. 23, 1968, Ser. No. 786,365
Int. Cl. C07d 31/36
U.S. Cl. 260—295.5     3 Claims

ABSTRACT OF THE DISCLOSURE

Nicotinoyl esters of dihydroxyacetone, trimethylolethane and trimethylolpropane were prepared by the reaction of nicotinoyl chloride and the appropriate polyol. The esters are potent vasodilators and are useful in treatment of hypertension. They also lower the cholesterol concentration in blood. However, unlike other nicotinoyl esters, they hydrolize slowly on absorption thereby preventing a high concentration of nicotinic acid and its undesirable side effects.

This application is a continuation-in-part of our copending patent application, Ser. No. 559,090, filed June 21, 1966 now abandoned.

The present invention relates to esters of nicotinic acid. It particularly relates to esters of nicotinic acid and polyhydroxy alcohols of the general formula

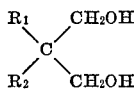

wherein $R_1$ is methyl or ethyl, $R_2$ is hydroxymethyl, or $R_1$ and $R_2$ taken together are an oxygen atom.

In accordance with this description the esters of this invention are: dihydroxyacetone dinicotinate, trimethylolethane trinicotinate, and trimethylol-propane trinicotinate.

The new esters of this invention are prepared using the usual methods and techniques of esterification, but preferably, the reaction between a polyhydroxy compound and nicotinoyl chlorine in the presence of a base such as a tertiary amine, or the reaction between the halogen derivative of the corresponding polyol, e.g., 1,3-dichloroacetone, and a salt of nicotinic acid is used. The preparation of the esters is shown in detail in the examples which follow.

EXAMPLE 1

To 58.4 g. sodium nicotinate in 400 g. dimethyl formamide, 25.6 g. 1,3-dichloro-acetone is added rapidly dropwise with stirring. The reaction is heated with stirring for one hour at 100° C. and then cooled. The product precipitates on cooling and is freed from the sodium chloride which also precipitates by washing with water. The crude dihydroxy-acetone dinicotinate is recrystallized from 70% aqueous ethanol while using activated carbon. The crystalline product has a M.P. of 174.5–175° C.

EXAMPLE 2

To 26.8 g. trimethylol-propane in 142 g. dry pyridine 160 g. nicotinoyl chloride is added portionwise with stirring keeping the temperature at about 30° C. After the addition is completed the reaction mixture is kept at 100° C. for about five hours. The reaction mixture is then poured onto a mixture of about 1,200 g. ice and 800 g. water to produce a dark brown sticky precipitate. The water is removed and the precipitate is recrystallized from benzene-ligroin, then from aqueous alcohol using activated carbon, and finally, from a 1:3:1 solution of acetonitrile:ligroin:ether. The product has a M.P. of 80–81° C.

EXAMPLE 3

The procedure of Example 2 was followed, using trimethylol-ethane in place of trimethylol-propane. The product has a M.P. of 94–95° C.

The new esters of this invention are readily absorbed when administered to animals and produce a rapid increase in the peripheral blood flow that is characteristic of nicotinic acid, its pharmaceutically acceptable salts such as sodium nicotinate, and the known esters of nicotinic acid. However, the great increase in the peripheral blood flow produced by sodium nicotinate is of rather short duration, and is accompanied by a very pronounced flush with unpleasant irritating effects on the skin tissues. This flush and irritating effect, which are also produced by the known esters of nicotinic acid such as methyl nicotinate and pentaerythritol tetranicotinate, are probably caused by the momentary great increases in blood having a high concentration of nicotinic acid. Unlike the other esters of nicotinic acid, nicotinic acid, and salts of nicotinic acid, the new esters of nicotinic acid of this invention while being rapidly absorbed are stored in adipose and other tissues from which tissues the free nicotinic acid is released slowly on gradual hydrolysis. While this rate of hydrolysis is still sufficient to produce a concentration of nicotinic acid in an amount sufficient to produce the desirable biological effects of nicotinic acid, the concentration of the free nicotinic acid is never high enough to produce the undesirable flushing and irritating effects. Thus studies on dihydroxy-acetone dinicotinate and pentaerythritol tetranicotinate which have been administered in quantities which will have substantially the same amount of the nicotinic acid moiety show that there is less flushing and lesser intensity of flushing produced by the dihydroxy-acetone nicotinate.

The new esters of this invention also lower the chloesterol level in serum and again a comparison of dihydroxyacetone dinicotinate and pentaerythritol tetranicotinate shows that a much greater lowering of the cholesterol level in serum is obtained with the new ester of this invention.

The effect on the peripheral blood and the duration of activity of the three new esters are essentially about the same for all three, with trimethylol-ethane trinicotinate showing somewhat the longest duration of activity and dihydroxy-acetone dinicotinate the least.

What is claimed is:
1. An ester of nicotinic acid selected from the group of esters of the formula

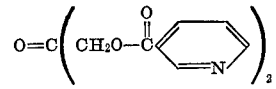

and

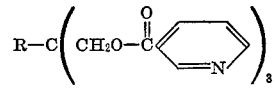

wherein R is selected from the group consisting of methyl and ethyl.

2. An ester according to claim 1 wherein R is methyl.
3. An ester according to claim 1 wherein R is ethyl.

References Cited

UNITED STATES PATENTS

| | | | |
|---|---|---|---|
| 2,863,873 | 12/1958 | Ekenstam et al. | 260—295.5 |
| 3,096,336 | 7/1963 | Ferguson | 260—295.5 |

FOREIGN PATENTS

| | | |
|---|---|---|
| 2,046 | 9/1963 | France. |

OTHER REFERENCES

Kn. Lan et al.: Chem. Abstracts, vol. 22, pp. 3645–6 (1928).

HENRY R. JILES, Primary Examiner

A. L. ROTMAN, Assistant Examiner

U.S. Cl. X.R.

424—266